United States Patent
Van Druten et al.

(10) Patent No.: US 10,214,051 B2
(45) Date of Patent: Feb. 26, 2019

(54) REAR WHEEL AXLE, AS WELL AS BICYCLE FRAME AND REAR WHEEL FOR A BICYCLE

(71) Applicant: ADVANCING TECHNOLOGIES B.V., Eindhoven (NL)

(72) Inventors: Roell Marie Van Druten, Eindhoven (NL); Johannes Gijsbertus Antonius Van Den Brand, Eindhoven (NL)

(73) Assignee: ADVANCING TECHNOLOGIES B.V., Eindhoven (NL)

(*) Notice: Subject to any disclaimer, the term of this patent is extended or adjusted under 35 U.S.C. 154(b) by 0 days.

(21) Appl. No.: 15/122,199

(22) PCT Filed: Mar. 2, 2015

(86) PCT No.: PCT/NL2015/050128
§ 371 (c)(1),
(2) Date: Aug. 29, 2016

(87) PCT Pub. No.: WO2015/130175
PCT Pub. Date: Sep. 3, 2015

(65) Prior Publication Data
US 2016/0368318 A1    Dec. 22, 2016

(30) Foreign Application Priority Data
Feb. 28, 2014   (NL) .................................... 2012339

(51) Int. Cl.
*B60B 27/02*    (2006.01)
*B60B 27/06*    (2006.01)
(Continued)

(52) U.S. Cl.
CPC .......... *B60B 27/023* (2013.01); *B60B 27/026* (2013.01); *B60B 27/065* (2013.01);
(Continued)

(58) Field of Classification Search
CPC ... B60B 27/023; B60B 27/026; B60B 27/065; B62K 25/02; B62K 2206/00; B62M 11/16
See application file for complete search history.

(56) References Cited

U.S. PATENT DOCUMENTS 6,374,975 B1    4/2002  Schlanger
6,409,281 B1*   6/2002  Kanehisa .............. B60B 27/026
                                                301/110.5
(Continued)

FOREIGN PATENT DOCUMENTS

CN    101249866    8/2008
CN    101327826    12/2008
(Continued)

OTHER PUBLICATIONS

International Search Report, dated Jul. 29, 2015, from corresponding PCT application.
(Continued)

Primary Examiner — Kip T Kotter
(74) Attorney, Agent, or Firm — Young & Thompson

(57) ABSTRACT

A rear wheel axle for a bicycle includes a hollow wheel axle and an axle shaft inserted therethrough and torque support elements for supporting torque exerted on the wheel axle on drop outs of a bicycle frame. The torque support elements are formed by a first part of an outside of the axle shaft and a part of an inside of the wheel axle, which parts jointly form a first form locked connection, and are also formed by a second part of the outside of the axle shaft, which together with a bounding wall of a through hole provided in an inserted piece which is fixed in the direction of rotation relative to one of the drop outs, forms a second form locked connection. The first and second parts of the outside of the axle shaft are fixed relative to each other in the direction of rotation of the axle shaft.

13 Claims, 3 Drawing Sheets

(51) Int. Cl.
   *B62K 25/02* (2006.01)
   *B62M 11/16* (2006.01)
   *B62M 11/14* (2006.01)
   *B60B 27/00* (2006.01)
   *B60B 35/04* (2006.01)
   *B62K 3/02* (2006.01)

(52) U.S. Cl.
   CPC ............ *B62K 25/02* (2013.01); *B62M 11/16* (2013.01); *B60B 27/0015* (2013.01); *B60B 35/04* (2013.01); *B62K 3/02* (2013.01); *B62K 2025/025* (2013.01); *B62M 11/14* (2013.01)

(56) References Cited

U.S. PATENT DOCUMENTS

| | | | | |
|---|---|---|---|---|
| 7,530,645 | B2* | 5/2009 | Takachi | B62K 25/02 301/110.5 |
| 7,628,416 | B2 | 12/2009 | Hara | |
| 7,669,871 | B2* | 3/2010 | Watarai | B62K 25/02 280/260 |
| 9,227,465 | B2* | 1/2016 | Nakajima | B62K 25/04 |
| 2002/0140201 | A1* | 10/2002 | Kirk | B62K 25/02 280/279 |
| 2006/0191764 | A1* | 8/2006 | Kanehisa | B60B 27/0005 192/64 |
| 2008/0284127 | A1* | 11/2008 | Watarai | B62K 25/02 280/279 |
| 2008/0315678 | A1 | 12/2008 | Watarai | |
| 2013/0270893 | A1* | 10/2013 | Schlanger | B60B 27/026 301/105.1 |
| 2014/0049020 | A1* | 2/2014 | Wendt | B62K 25/02 280/259 |

FOREIGN PATENT DOCUMENTS

| | | |
|---|---|---|
| EP | 0 890 505 A1 | 1/1999 |
| EP | 0890505 | 1/1999 |
| EP | 1 961 650 A2 | 8/2008 |

OTHER PUBLICATIONS

Chinese Office Action for Application No. 201580023471.7, dated Apr. 4, 2018.

* cited by examiner

REAR WHEEL AXLE, AS WELL AS BICYCLE FRAME AND REAR WHEEL FOR A BICYCLE

FIELD OF THE INVENTION

The invention relates to a rear wheel axle for a bicycle comprising a hollow wheel axle and an axle shaft inserted through it, which rear wheel axle is provided with torque support means for supporting on a drop out of a bicycle frame torque exerted on the wheel axle.

STATE OF THE ART

A rear wheel comprising a rear wheel axle is known from EP-A-0 890 505. With this known rear wheel a sprocket carrier and a wheel hub connected to it is bearing-mounted on the rear wheel axle. Changing a rear wheel of a bicycle that is provided with this known rear wheel can be executed in a rapid manner since only the axle shaft needs to be removed from the hollow wheel axle. The connection between the rear wheel axle and the bicycle frame forms the above-mentioned torque support means. With this known rear wheel axle the torque support is effected by means of a friction-based friction-locked connection between the rear wheel axle and drop outs of the frame. When applying a drive between the sprocket carrier and the wheel hub in this known rear wheel, large torques are to be supported on the bicycle frame. The above mentioned friction-locked connection between rear wheel axle and bicycle frame will not suffice for this purpose.

SUMMARY OF THE INVENTION

It is an object of the invention to provide a rear wheel axle of the type defined in the opening paragraph where, when used in a bicycle, larger torques can be supported on the bicycle frame than is the case with the known rear wheel axle, as is necessary with a rear wheel axle that is provided with a drive between a sprocket which is rotatable relative to the wheel axle and a wheel hub that is bearing-mounted on a rear wheel, without the changing of the rear wheel taking longer for a bicycle that is provided with a rear wheel axle of this type. For this purpose the rear wheel axle according to the invention is characterized in that the torque support means are formed by a first part of an outside of the axle shaft and a part of an inside of the wheel axle, which parts jointly form a first form locked connection, as well as by a second part of the outside of the axle shaft, which second part of the outside of the axle shaft together with a bounding wall of a through hole in the drop outs of the bicycle frame or of a further through hole present in an inserted piece which in the direction of rotation is fixed relative to the drop out, forms a second form locked connection, where the first and second parts of the outside of the axle shaft are fixed relative to each other in the direction of rotation of the axle shaft. When applying the rear wheel axle according to the invention to a bicycle, a form locked connection is thus available between the rear wheel axle and the bicycle frame via which larger torques can be supported than is the case with the known rear wheel. When changing a rear wheel of a bicycle that is provided with a rear wheel axle according to the invention still only the axle shaft needs to be removed from the hollow wheel axle after which the rear wheel can be directly removed from the rear fork of the bicycle, so that this can be effected in as rapid a manner as with a bicycle that is provided with the known rear wheel.

An embodiment of the rear wheel axle according to the invention is characterized in that the axle shaft comprises a pin as well as a bush freely rotatable around the pin, where the first and second parts of the form locked connections are formed by the bush. An advantage of this construction is that the pin can rotate for being fixed to the bicycle frame (for example by means of threaded or bayonet connection) whereas the bush in the direction of rotation can remain stationary relative to the wheel axle when the axle shaft is mounted.

A further embodiment of the rear wheel axle according to the invention is characterized in that the first and second form locked connections are formed by splines, where from the first form locked connection said part of the inside of the wheel axle is provided with a first number of first splines which are present, preferably evenly distributed over the periphery and the first part of the outside of the axle shaft is provided with a second number of second splines which are also present, preferably evenly distributed over the periphery and are each present between two neighbouring first splines, where the first number is a multiple of the second number, and where from the second form locked connection said bounding wall is provided with a third number of third splines which are also present, preferably evenly distributed over the periphery and are identical with the first splines, where the second number is equal to or a multiple of the third number, and the second part of the outside of the axle shaft is provided with at least a single fourth spline which is wider and shorter than the third splines and in tangential direction fills up the gap between two neighbouring third splines.

This construction makes it possible that when the axle shaft is inserted, the hollow wheel axle need not be aligned relative to the through hole in the bicycle frame or the further through hole in the inserted piece. The axle shaft is first inserted with said first part into the through hole in the bicycle frame or the further through hole in the inserted piece and in this position is freely rotatable over a limited angle. Subsequently, the axle shaft is aligned relative to the first splines and with its first part inserted into the hollow wheel axle until the fourth spline touches the third splines. Subsequently, the axle shaft is rotated until the third and fourth splines are aligned and the axle shaft can be inserted further and tightened.

A further embodiment of the rear wheel axle according to the invention is characterized in that the fourth spline at the end facing the second splines is bevelled such that when the bush moves in axial direction the bush rotates because the bevel touches a first spline and the third and fourth splines take up the correct state relative to each other so as to allow the bush to be inserted further.

Preferably, the second form locked connection comprises a fourth number of fourth splines which are present, preferably evenly distributed over the periphery, where the fourth number is equal to the third number.

Yet a further embodiment of the rear wheel axle according to the invention is characterized in that the axle shaft on one side is provided with connecting means, more specifically thread, and on the other side is provided with a tensioning mechanism for clamping the wheel axle between the drop outs of the bicycle frame. An advantage of this construction is that the axle shaft can be fitted to the bicycle frame with one hand with a defined pretension.

The invention likewise relates to a rear wheel for a bicycle comprising a rear wheel axle according to the invention, as well as a transmission provided with a driver body and torque means, which transmission comprises at least one drive via which the driver body is connected to the torque means, which rear wheel further includes a wheel hub which is bearing-mounted on the wheel axle and comprises further torque means which together with the torque means forms a third form locked connection. The torque means are preferably formed by a bush provided with external splines and the further torque means are preferably formed by a part of the wheel hub inner wall provided with internal splines. An advantage of form locked torque means is that they can transfer a very high torque in a limited space.

Preferably, the drive comprises a planetary gear set including three rotational members, of which a first rotational member is connected to the driver body, a second rotational member is connected to the torque means and a third rotational member is connected to the wheel axle.

Furthermore, the invention is related to a bicycle frame comprising a rear fork having two drop outs for cooperation with a rear wheel axle according to the invention, which drop outs are each provided with a through hole through which the axle shaft can be inserted, which bicycle frame comprises a support element that is provided with a further through hole through which the axle shaft can be inserted, where the hounding wall of the further hole together with the second part of the outside of the axle shaft forms the second form locked connection, which support element is locked against rotation around the axis of the further hole by an either or not releasable connection to one of the drop outs of the frame. For this operation the support element can continue to be fixedly connected to the rear fork when the rear wheel is changed.

An embodiment of the bicycle frame according to the invention is characterized in that the support element is formed by an inserted piece which is present in the through hole of one of the drop outs and is connected to the drop out in a form locked manner. The inserted piece can be invisibly concealed in the drop out.

A further embodiment of the bicycle frame according to the invention is characterized in that the support element is provided with a torque support arm which rests against the drop out. This support element can be used in a variety of rear forks in different frames.

The invention further relates to a bicycle comprising a bicycle frame and a rear wheel according to the invention.

BRIEF DESCRIPTION OF THE DRAWING FIGURES

The invention will be further described below in more detail with reference to an example of embodiment represented in the drawings of a rear wheel axle of a bicycle and fitted to the rear wheel axle a wheel hub and a transmission according to the invention, in which drawings.

DETAILED DESCRIPTION OF THE DRAWING FIGURES

Figure 1:
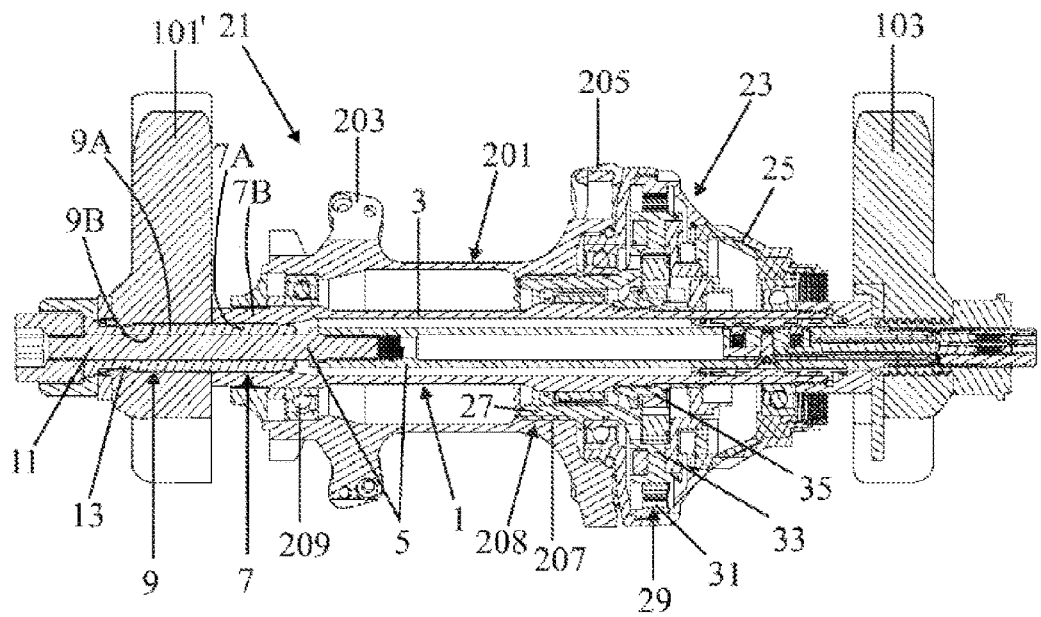
FIG. 1 shows a part of a rear wheel present between drop outs of a bicycle frame of a bicycle.

FIG. 1 shows in a sectional view a part of a rear wheel 21 according to the invention, present between drop outs 101' and 103 of a bicycle frame of a bicycle. The rear wheel 21 comprises a rear wheel axle 1 and present thereon a transmission 23 and a wheel hub 201 whose end is bearing mounted to the wheel axle via bearing 209 and whose other end is coupled to the transmission 23.

The rear wheel axle 1 comprises a hollow wheel axle 3 which, at one end is provided with internal splines for a form locked connection to one of the drop outs 101' of a rear fork of the bicycle frame. Via this form locked connection the wheel axle can support torque, which torque is a reacton torque of the drive between a driver body 25 of the transmission and the wheel hub 201. The wheel hub 201 has two spoke flanges 203 and 205 to which spokes (not shown) of the rear wheel are fixed. A sprocket carrier (not shown) with sprockets fitted thereto can be installed on the driver body 25 of the transmission 23.

The transmission 23 comprises two switchable drives between the driver body 25 and the wheel hub 201, so that it will suffice to have only a single sprocket on the crank axle, and thus a front derailleur of a bicycle may be omitted. The transmission 23 is formed via a form locked connection 208 by splines coupled to the wheel hub 201. These splines comprise internal splines 207 present in the wheel hub and external splines 27 on an output torque bush 28 of the transmission. The transmission 23 together with the hollow wheel axle 3 to which it is mounted forms a unit which as a whole can be partly inserted into the wheel hub 201 and together with the wheel hub (and the rest of the rear wheel the wheel hub forms part of) can be inserted between drop outs 101' and 103 of a rear fork of a bicycle frame and removed therefrom.

The two switchable drives of transmission 23 are formed by a planetary gear set 29 having three rotational members, a first rotational member of which is formed by an annulus gear 31 which is connected to the driver body 25, a second rotational member of which is formed by a planet gear support 33 on which a number of planet gears are bearing mounted. By means of a first coupling the planet gear support 33 can be coupled to and decoupled from the driver body 25 to which the annulus gear 31 is fitted. A third rotational member is formed by a sun gear 35 which is coupled to the wheel axle 3. By means of a second coupling the sun gear can be coupled to and decoupled from the hollow wheel axle 3. The planet gear support 33 is connected to torque means formed by the torque hush 28 provided with external splines 27.

Figure 2:
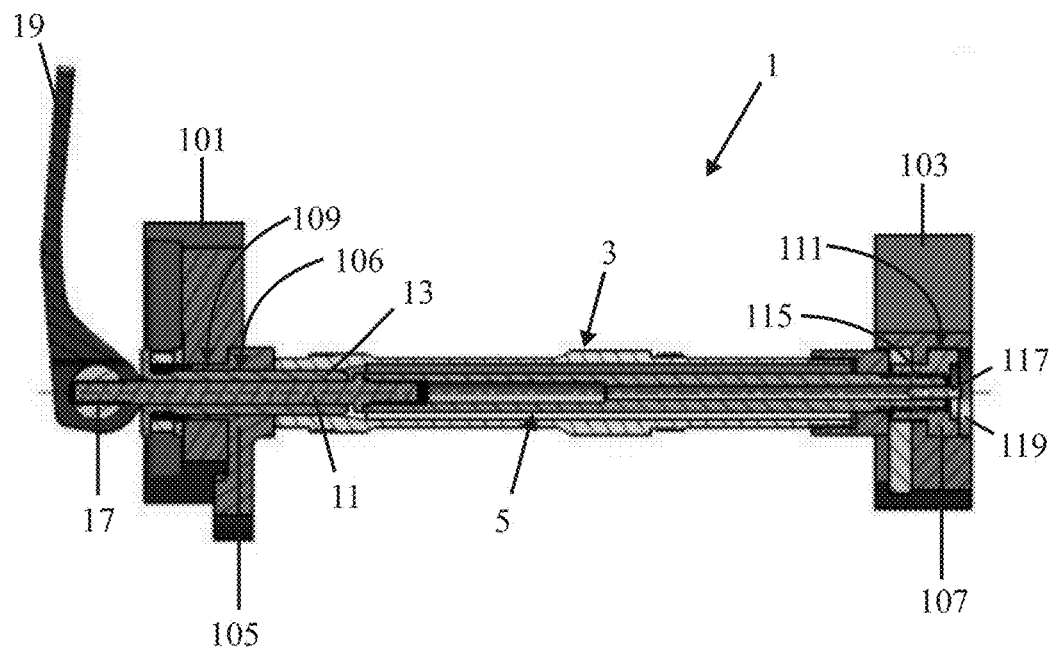
FIG. 2 shows a rear wheel axle of a rear wheel fitted in drop outs provided with two insert pieces.
Figure 3:
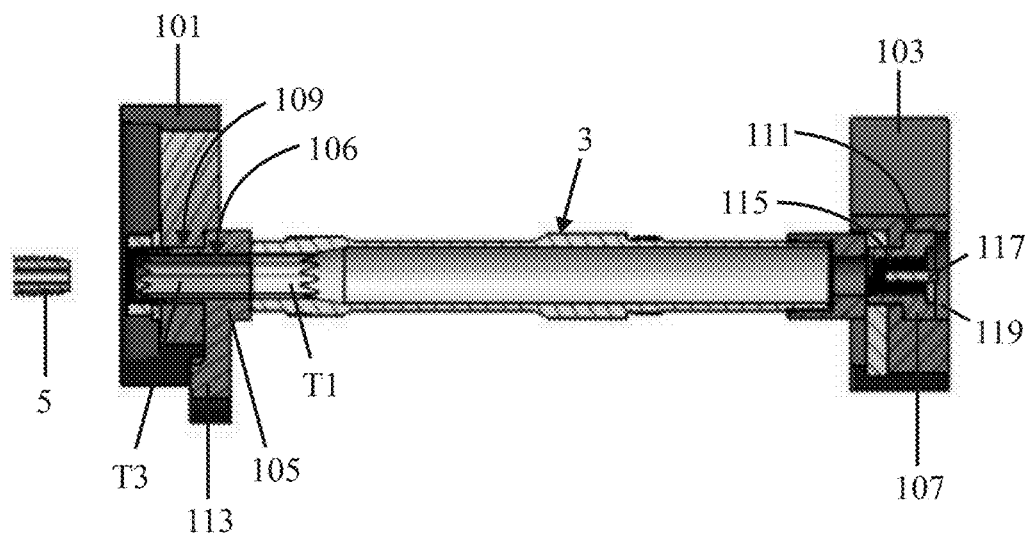
FIG. 3 shows a sectional view of the separate wheel axle of the rear wheel axle of FIG. 2 present between the drop outs.

FIG. 2 shows in a sectional view a rear wheel axle 1 fixed between drop outs 101 and 103 of the rear fork of a bicycle provided with two insert pieces, and FIG. 3 shows the separate wheel axle of this rear wheel axle situated in between the drop outs. The rear wheel axle 1 comprises the hollow wheel axle 3 and an axle shaft 5 inserted through it.

The rear wheel axle is provided with torque support means for supporting on a bicycle frame the torque exerted on the wheel axle.

These torque support means are formed by a first part 7A of an outside of the axle shaft 5 and a part 7B of an inside of the wheel axle 3, which parts jointly form a first form locked connection 7, and also by a second part 9A of the outside of the axle shaft 5 which, jointly with a bounding wall 9B of a through hole 106 present in an inserted piece 105 which in the direction of rotation is fixed relative to the left hand drop out 101, forms a second form locked connection 9. The axle shaft 5 comprises a pin 11 and a bush 13 freely rotatable around it, where the first and the second part 7A, 9A of the form locked connections 7 and 9 are formed by the bush 13.

Figure 5:
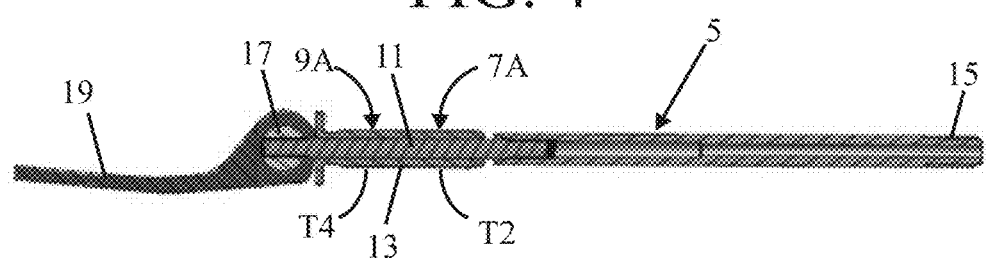
FIG. 5 shows the separate axle shaft of the rear wheel axle of FIG. 2.

The pin 11 together with the bush 13 freely rotatable around it forms the axle shaft 5, see FIG. 5. The pin 11 comprises a solid part and a hollow part which are connected together by means of a threaded joint. The axle shaft is provided with a quick-release mechanism for clamping the wheel axle 3 between the drop outs 101 and 103. This quick-release mechanism is formed by a lever 19 which is eccentrically connected to an axle 17 mounted to the end of the pin 11.

Figure 4:
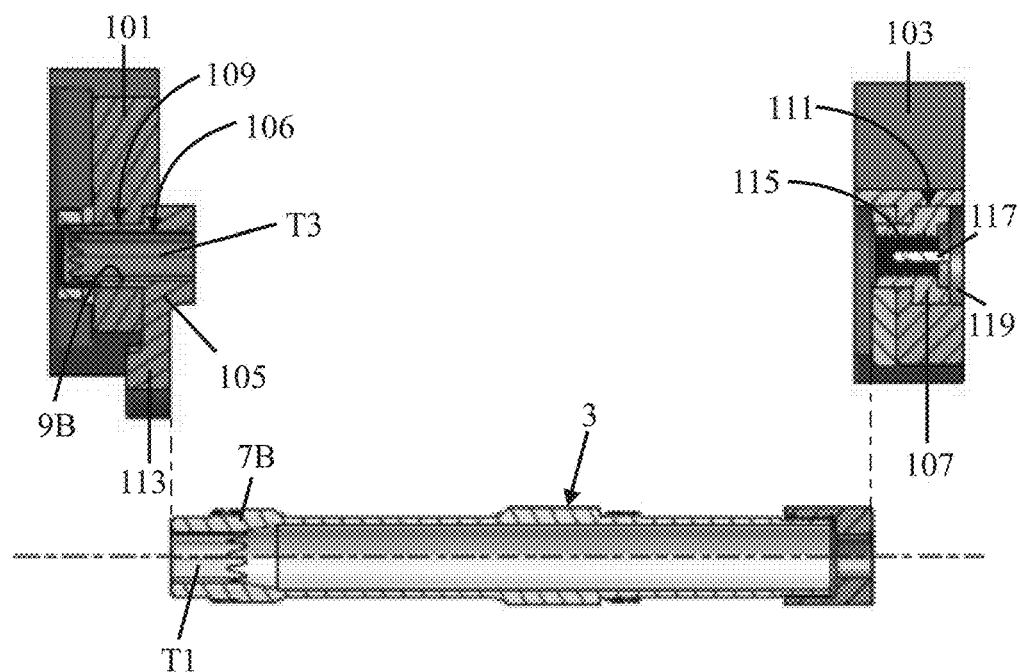
FIG. 4 shows the drop outs of the bicycle frame of FIG. 2 with wheel axle taken out.

The free end of the pin 11 is provided with external thread 15 which is turned into the right hand drop out 103 in an inserted piece 107 present in a hole 111 and provided with internal thread 115. The pin 11 is provided with two first electrical contacts at the end that is provided with internal thread 15, which contacts are preferably radially positioned relative to each other in the head end of the pin. The right hand drop out 103 is provided with two second electrical contacts 117, see FIG. 4, present on a plug 119 connected to the inserted piece 107 and which may come into contact with the two first electrical contacts 23 in the free end of the pin 11 of the axle shaft 5 when the latter has been mounted. The pin is further provided with two third electrical contacts which are preferably present side by side in axial direction and are accessible at the outside of the pin. These third electrical contacts are directly connected to the first electrical contacts in the pin. The wheel axle 3 accommodates two fourth electrical contacts which may come into contact with the two third electrical contacts when the axle shaft has been mounted. This is advantageous in that when the axle shaft is being mounted it is also possible to make electrical contact between the inserted piece 107 and the wheel axle 3. This electrical contact may be used for operating for example an electrical actuator which is mounted on the wheel axle. This electrical contact is present in the wheel axle so that it is protected from water and dirt.

Figure 6:
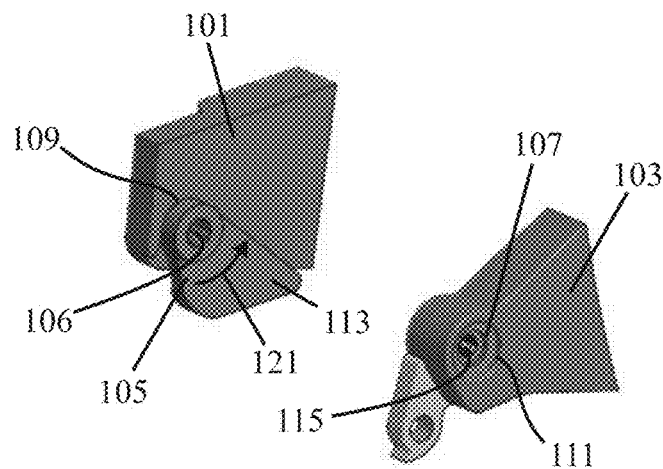
FIG. 6 shows the drop outs shown in FIG. 4 with inserted pieces.

FIG. 6 shows by way of illustration the drop outs 101 and 103 in a perspective view. The through hole 109 in the drop out 101 accommodates the inserted piece 105 which is provided with the further through hole 106 that has internal splines. This inserted piece 105 has a torque support arm 113 which in the direction or rotation 121 rests against the drop out 101 so that this arm is locked against rotation and hence can support torque. The inserted piece 107 accommodated in the through hole 111 in the drop out 103 is provided with a through hole 115 that has internal thread.

Figure 7:
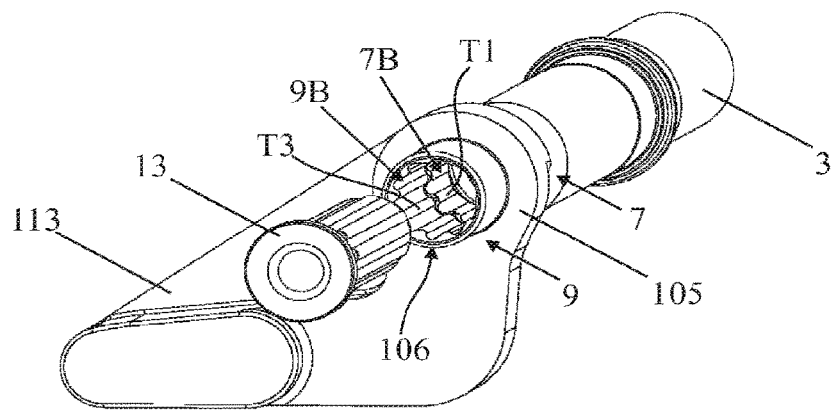
FIG. 7 shows the inserted piece comprising a torque support arm together with the wheel axle and a loose bush of the axle shaft.
Figure 8:
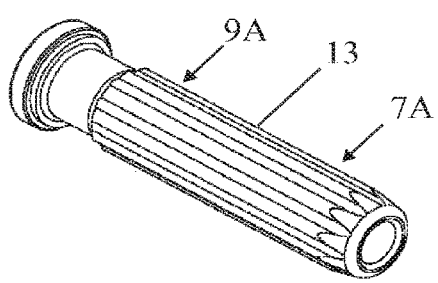
FIG. 8 shows a detailed view of the bush of the axle shaft.

FIG. 7 shows in a perspective view the inserted piece 105 comprising a torque support arm 113 together with the wheel axle 3 and the bush 13 of the axle shaft. The part 7B on the inside of the wheel axle 3 is provided with splines as is the bounding wall 9B of the through hole 106 in the inserted piece 105. The bush 13 is provided with external splines which together with the internal splines forms two form locked connections. FIG. 8 shows the bush 13 separately. The parts 7A and 9A form parts of splines which extend over substantially the entire length of the bush. For inserting the bush 13 into the inserted piece 105 and the hollow wheel axle 3 the wheel axle is to be in a position relative to the inserted piece where the splines of the wheel axle in the inserted piece are in line.

Figure 9:
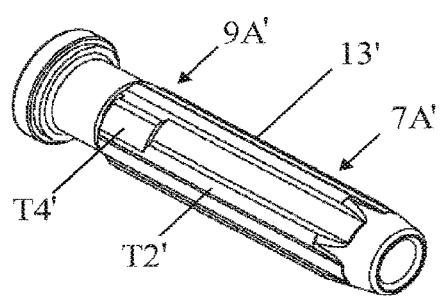
FIG. 9 shows a preferred embodiment of the bush of the axle shaft.

Hereinafter a construction is described where it is not necessary for the wheel axle to be positioned in tangential direction relative to the inserted piece for still inserting the bush into it. FIG. 9 shows the bush 13' of this construction. In this construction the part 7B of the inside of the wheel axle of the first form locked connection 7 is provided with a number of first splines T1 which are evenly distributed over the periphery, and the first part 7A of the outside of the axle shaft 5 is provided with a second number of second splines T2 which are also evenly distributed over the periphery and are each present between two neighbouring first splines T1. The first number in this case is a multiple of the second number; in the construction shown in the drawing figures this multiple equals 2.

Furthermore, in this construction of the second form locked connection 109 said bounding wall 9B is provided with a third number of third splines T3 which are also evenly distributed over the periphery and are identical with the first splines T1. The second number is here equal to or a multiple of the third number. In this example the second number is equal to the third number, which is not the situation shown in FIG. 7. The bounding wall 9B in this construction has half the number of splines shown. The second part 9A of the outside of the axle shaft 5 is provided with at least a single fourth spline T4 which is wider and shorter than the third splines T3 and in tangential direction fills the gap between two neighbouring third splines.

This construction makes it possible that for the insertion of the bush 13' the hollow wheel axle 3 need not be aligned in tangential direction relative to the through hole 106 in the inserted piece 105. The bush 13' is first inserted with a first part 7A' provided with further second splines T2' into the through hole 106 in the inserted piece and in this position is freely rotatable over a limited angle. Subsequently, the bush 13' is aligned with respect to the first splines T1 and inserted with the first part 7A' into the hollow wheel axle 3 until a further fourth spline T4' present on a second part 9A' touches the third splines T3. Then the bush 13' is rotated until the third and fourth splines are aligned and the bush can be inserted further. By bevelling the fourth spline the alignment of the third and fourth splines may also be effected while the axle shaft is screwed in where the bush 13' then moves in axial direction and with a part of the bevelled portion touches a first spline and with a further axial movement rotates and then also rotates the hollow wheel axle while doing so until the third splines are in line with the first splines and the bush can be inserted further.

In lieu of a single fourth spline T4', the second portion of the bush 13' may also be provided with a fourth number of fourth splines which are evenly distributed over the periphery. In that case the fourth number is to be equal to the third number.

Albeit the invention has been elucidated in the foregoing with reference to the drawings, it should be set out that the invention is not by any manner or means restricted to the embodiment shown in the drawing figures. The invention also extends to any embodiments deviating from the embodiment shown in the drawing figures within the scope defined by the claims. For example, in lieu of the torque support arm, also in the through hole in the left hand drop out may be present an inserted piece which is present in a form locked manner between the bounding wall of the through hole and the drop out.

The invention claimed is:

1. A rear wheel axle for a bicycle comprising
a hollow wheel axle;
an axle shaft inserted through the hollow wheel axle;
a torque support supporting on a drop out of a bicycle frame torque exerted on the wheel axle, wherein
the torque support is formed by a first part of an outside of the axle shaft and a part of an inside of the wheel axle, said parts jointly form a first connection form locked in a direction of rotation of the axle shaft, and by a second part of the outside of the axle shaft, which together with a bounding wall of a through hole in the drop out of the bicycle frame or of a further through hole present in an inserted piece in said direction of rotation is fixed relative to the drop out forms a second connection form locked in said direction of rotation, where the first and second parts of the outside of the axle shaft are fixed relative to each other in the direction of rotation of the axle shaft.

2. The rear wheel axle as claimed in claim 1, wherein the axle shaft comprises a pin and a bush freely rotatable around the pin, where the first and second parts of the form locked connections are formed on the bush.

3. The rear wheel axle as claimed in claim 2, wherein the first and second form locked connections are formed as splined connections, where from the first form locked connection said part of the inside of the wheel axle is provided with a first number of first splines which are distributed over the periphery and the first part of the outside of the axle shaft or the bush of the axle shaft is provided with a second number of second splines which are also distributed over the periphery and are each present between two neighbouring first splines, where the first number is equal to or a multiple of the second number, and where from the second form locked connection said bounding wall is provided with a third number of third splines which are also distributed over the periphery, where the second number is a multiple of the third number, and the second part of the outside of the axle shaft is provided with at least a single fourth spline which is wider and shorter than the third splines and in tangential direction fills up the gap between two neighbouring third splines.

4. The rear wheel axle as claimed in claim 1, wherein the first and second form locked connections are formed as splined connections, where from the first form locked connection said part of the inside of the wheel axle is provided with a first number of first splines which are distributed over the periphery and the first part of the outside of the axle shaft or a bush of the axle shaft is provided with a second number of second splines which are also distributed over the periphery and are each present between two neighbouring first splines, where the first number is equal to or a multiple of the second number, and where from the second form locked connection said bounding wall is provided with a third number of third splines which are also distributed over the periphery, where the second number is a multiple of the third number, and the second part of the outside of the axle shaft is provided with at least a single fourth spline which is wider and shorter than the third splines and in tangential direction fills up the gap between two neighbouring third splines.

5. The rear wheel axle as claimed in claim 4, wherein the fourth spline has an end facing the second splines, said end being bevelled.

6. The rear wheel axle as claimed in claim 5, wherein the second form locked connection comprises a fourth number of fourth splines which are distributed over the periphery, where the fourth number is equal to the third number.

7. The rear wheel axle as claimed in claim 4, wherein the second form locked connection comprises a fourth number of fourth splines which are distributed over the periphery, where the fourth number is equal to the third number.

8. The rear wheel axle as claimed in claim 1, wherein the axle shaft on one side is provided with a connector, and on an other side is provided with a tensioning mechanism for clamping the wheel axle between the drop out of the bicycle frame.

9. A rear wheel for the bicycle comprising:
the rear wheel axle as claimed in claim 1; and
a transmission comprising a driver body (25) and torque means, said transmission comprises at least one drive connecting the driver body to the torque means, said rear wheel further includes a wheel hub which is bearing-mounted on the wheel axle and comprises further torque means which together with the torque means forms a third form locked connection.

10. The rear wheel as claimed in claim 9, wherein the drive comprises a planetary gear set including three rotational members, of said three rotational members a first rotational member is connected to the driver body, a second rotational member is connected to the torque means and a third rotational member is connected to the wheel axle.

11. The bicycle frame comprising a rear fork having the drop out for cooperation with the rear wheel axle as claimed in claim 1, said drop out is provided with the through hole through which the axle shaft can be inserted, where the bounding wall of the through hole in the drop out of the bicycle frame, or of the further through hole present in the inserted piece, together with the second part of the outside of the axle shaft forms the second form locked connection.

12. The bicycle frame as claimed in claim 11, wherein the inserted piece is provided with a torque support arm which rests against the drop out.

13. The bicycle comprising the bicycle frame as claimed in claim 11, and a rear wheel including a transmission comprising a driver body and torque means, at least one drive connecting the driver body is connected to the torque means, said rear wheel further including a wheel hub which is bearing-mounted on the wheel axle and comprises further torque means which together with the torque means forms a third form locked connection.

* * * * *